United States Patent [19]

Lee et al.

[11] Patent Number: 4,670,035

[45] Date of Patent: Jun. 2, 1987

[54] METHOD AND APPARATUS FOR GENERATING MICROSHELLS OF REFRACTORY MATERIALS

[75] Inventors: Mark C. Lee, La Canada; Christopher Schilling, Montrose; George O. Ladner, Jr., Pasadena; Taylor G. Wang, Glendale, all of Calif.

[73] Assignee: California Institute of Technology, Pasadena, Calif.

[21] Appl. No.: 751,077

[22] Filed: Jul. 2, 1985

[51] Int. Cl.$^4$ ............................................. C03B 19/10
[52] U.S. Cl. ........................................ 65/21.4; 65/22; 65/32; 65/142; 264/5; 264/50; 425/6
[58] Field of Search ............... 65/21.4, 22, 142, 32; 264/5, 22, 50; 425/6

[56] References Cited

U.S. PATENT DOCUMENTS

| | | | |
|---|---|---|---|
| 4,279,632 | 7/1981 | Wang et al. | 65/21.4 |
| 4,303,432 | 12/1981 | Torobin | 65/21.4 |
| 4,400,191 | 8/1983 | Youngberg et al. | 65/21.4 |

Primary Examiner—Robert Lindsay
Attorney, Agent, or Firm—Freilich, Hornbaker, Rosen & Fernandez

[57] ABSTRACT

A system is described for forming accurately spherical and centered fluid-filled shells, especially of high melting temperature material. Material which is to form the shells is placed in a solid form in a container, and the material is rapidly heated to a molten temperature to avoid recrystallization and the possible generation of unwanted microbubbles in the melt. Immediately after the molten shells are formed, they drop through a drop tower whose upper end is heated along a distance of at least one foot to provide time for dissipation of surface waves on the shells while they cool to a highly viscous, or just above melting temperature so that the bubble within the shell will not rise and become off centered. The rest of the tower is cryogenically cooled to cool the shell to a solid state.

9 Claims, 3 Drawing Figures

METHOD AND APPARATUS FOR GENERATING MICROSHELLS OF REFRACTORY MATERIALS

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

Microshells of a diameter less than five milimeters can be formed by flowing a material in a molten state through an outer nozzle and another fluid such as gas through an inner nozzle to form a gas-filled pipe that breaks off into gas-filled shells. The shells fall into the top of a drop tower along which they are cooled to a solid state. If the shells are cooled rapidly, then the outside of the shell will not be precisely spherical, but will have a wavey surface. On the other hand, if the shell is cooled slowly, then the gas bubble within the shell will be off center.

One way to heat the shell material and the container and nozzle through which it passes, is by a resistance heater, either to heat the material to its molten temperature or to maintain it and the container at that temperature during shell formation. It is found that for high temperature-melting material, that the material tends to form unwanted lumps or particles of material. Also, microbubbles of gas in the material tend to coalesce to form bubbles of sufficient size to detract from the final spheres. A method for producing fluid-filled spheres which produced spheres with precisely spherical surfaces and gas bubbles that were precisely centered within the shell, and which avoided blockages of the nozzles by unwanted particles in the molten material which flows through the nozzles, would be of considerable value.

SUMMARY OF THE INVENTION

In accordance with one embodiment of the present invention, a method and apparatus are provided for forming accurately spherical and centered fluid-filled shells. One system includes a container with outer and inner nozzles through which molten liquid and a fluid such as gas pass to form a hollow extrusion that forms multiple molten shells. The molten shells drop into the top of a drop tower along which they are cooled to a state at which the shell is hard. The upper portion of the tower is heated to cool the molten shells at a relatively slow rate, to thereby provide time for dissipation of surface waves while the shell cools to a highly viscous state, or slightly above the melting temperature. The rest of the tower can be cooled to cool the viscous shell to a hardened state.

The shells can be initially formed by placing solid material into a container and then rapidly heating the material to its molten temperature in a period of less than 15 minutes even for material of a refractory-type melting temperature of over 1500° C. to minimize recrystallization and possible forming of unwanted gas bubbles. A molten material passes through a filter to block unwanted impurities such as oxides, and then into the other nozzle. The outer nozzle is formed in the bottom wall of a container that has integral bottom and side walls, so that the walls of the nozzle are integral with the container, to thereby avoid warping during heating from room temperature to a highly elevated temperature.

The novel features of the invention are set forth with particularity in the appended claims. The invention will be best understood from the following description when read in connection with the accompanying drawings.

DESCRIPTION OF THE PREFERRED EMBODIMENT

Figure 1:
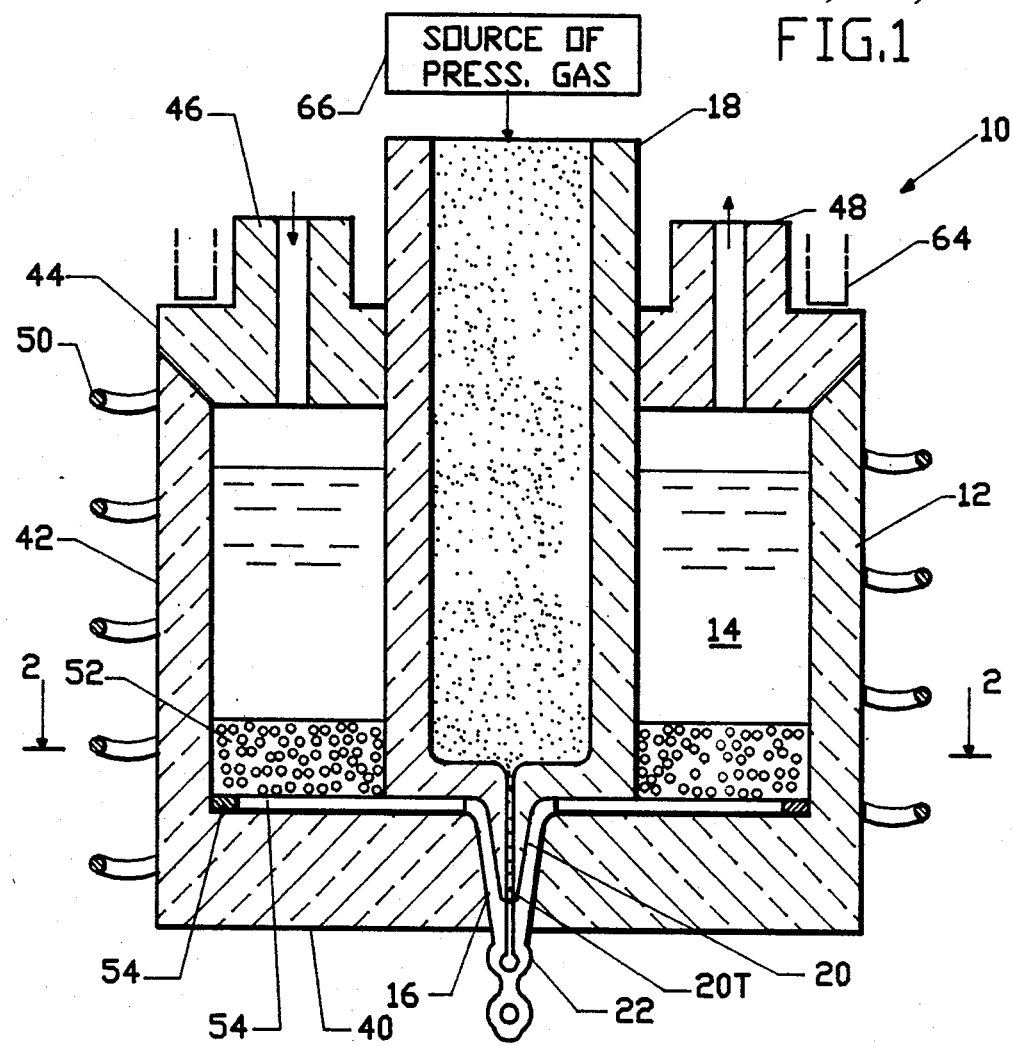
FIG. 1 is a sectional view of apparatus for forming fluid-filled shells constructed in accordance with the present invention.
Figure 2:
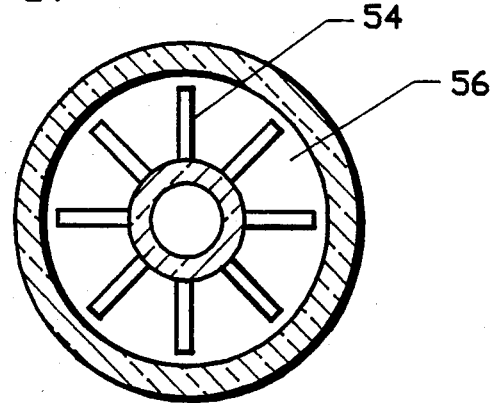
FIG. 2 is a view taken on the line 2—2 of FIG. 1.

FIG. 1 illustrates a microshell generator 10 which is used to form fluid-filled shells of at least a moderately high melting temperature material, that is, of a material that does not become molten ("molten" is herein defined as a viscosity less than about 10 poise) until it is heated to a temperature of more than about 1000° F. (537° C.). The generator includes a container 12 for holding a molten shell-forming material 14 which is forced out of an outer nozzle 16. The generator also includes a gas conduit 18 leading to an inner nozzle 20 that lies within an outer nozzle, and through which gas 21 is forced. The flowing molten material and gas form a gas-filled extrusion 22 that breaks up into individual gas-filled shells 24.

Figure 3:
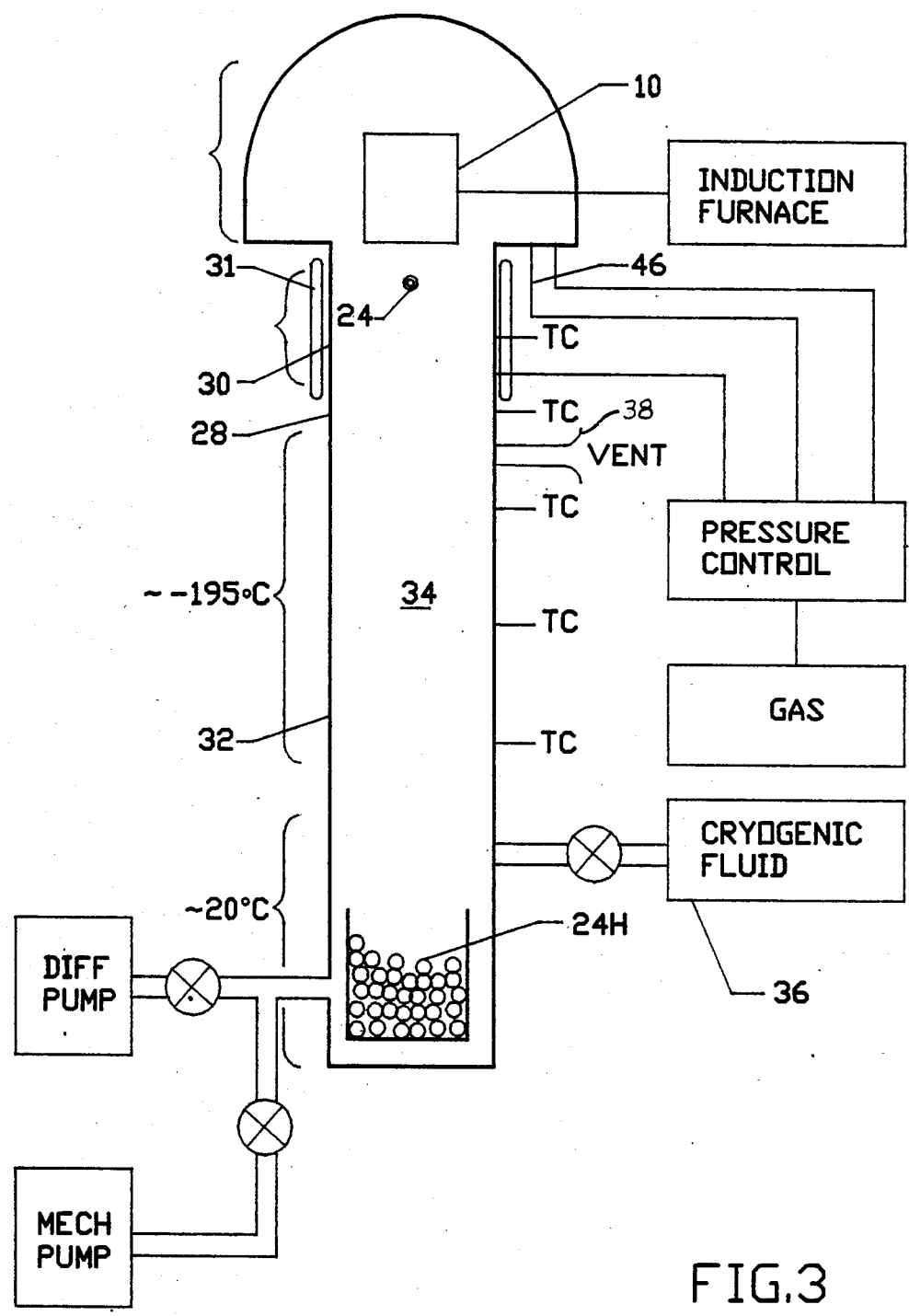
FIG. 3 is a sectional side view, not to scale, of a system which includes the apparatus of FIG. 1.

As shown in FIG. 3, an entire apparatus for generating shells 26 includes a drop tower 28 along which a shell 24 falls and along which it is cooled so that hardened shells 24H can be collected at the bottom of the tower.

It is found that when shells of high temperature (e.g. over 1000° F.) material are dropped in a molten state through a drop tower, which may be cooled along some or all of its height, the shells do not have a precisely spherical outer surface. Instead, the outer surface has ripples. Applicant has surmised that such ripples are caused by surface waves generated at the time when the molten shell 24 in FIG. 1 separates from the extrusion 22 passing out of the upper nozzle. If the molten shell is cooled very quickly, then it will reach a high viscosity (for glass) or harden, before the surface waves have dissipated, and the surface waves will appear in the hardened shell. For shells formed of relatively low melting temperature material (considerably below 1000° F.)) the difference in temperature between a molten shell and a drop tower at ambient temperature (72° F.) is not very great. Accordingly, the shell may cool slowly enough so that the surface waves will diminish by the time the shell has become highly viscous or hardened. As a result, surface waves do not appear in the outer surface of the shell.

Applicant avoids undulations in the outer surface of each microshell that is formed of high melting temperature material by heating the upper portion 30 of the drop tower 30, as by a clamp shell heater 31. Applicant heats the upper portion 30 of the tower to a temperature slightly below the liquid or melting temperature of the shell material. (at least one-half the temperature above ambient at which the material becomes molten). The heated portion 30 has a length of about 5 feet. When shells of a diameter no more than about one centimeter, and preferably no more than 0.5 centimeter, of high melting temperature materials are dropped through the tower which has a heated upper portion, there is sufficiently slow cooling of the shells so that the surface waves have dissipated by the time the shell has cooled to a temperature at which it has just about hardened.

The length of the heated upper portion 30 of the tower must not be too great, or else the gas bubble within each shell will become uncentered. The gas bubble tends to be centered in the heated upper portion of the tower, so the walls of the shell are of uniform thickness, by reason of an inherent normal mode oscillation and because of surface tension. If a molten shell is under zero gravity, which occurs when the shell is in free fall (without high wind resistance which prevents its continued acceleration by gravity), the gas bubble will become precisely centered within the shell. It may be noted that the drawings do not show any acoustic waves applied to the molten shell to break up the extrusion 22. During the first several feet of shell fall, the shell is not moving so fast that it experiences any significant wind resistance, and therefore the shell experiences no more than about one-tenth its weight and the bubble will remain centered within the shell. However, as the downward descent of the shell continues, and the shell velocity increases, the increased wind resistance prevents continued acceleration of the shell under the force of gravity. The gravity force then experienced by the shell increases towards 1G (1G is the force per unit mass on an object at the earth's surface which is stationary). It is therefore important to cool the shell to a temperature at which it is highly viscous or just about the melting temperature (at least about 10 poise) before the shell is moving down at a considerable speed such as more than about 16 feet per second, to prevent decentering of the gas bubble. All but the very smallest shells (e.g. below about 0.05 milimeter) will accelerate to a speed of about 16 feet per second during a time of about $\frac{1}{2}$ second during which it falls a distance of about five feet, in a tower having a gas pressure on the order of one atmosphere. Accordingly, the heated upper portion 30 of the tower has a height about five feet (below the nozzle tip), to avoid surface waves and to avoid decentering of the bubble within the shell.

The lower portion 32 of the drop tower is preferably cooled significantly below ambient temperature, that is, cooled to at least 20° C. below ambient temperature (72° F. or 22° C.). This permits cooling of a shell of high melting temperature material to its hardened state during its fall through a drop tower of reasonable height, such as a total height of about 45 feet. Applicant maintains an atmosphere 34 within a drop tower of 45 feet height, wherein the atmosphere 34 is composed of helium gas at a pressure of about 170 rds that of atmospheric. The helium gas is cooled to a temperature of about −195° C. by liquid nitrogen and is flowed upwardly from a source 36 into a lower portion of the tower, to a vent 38 which is located a short distance below the heated upper portion 30 of the tower.

The container 12 of the microshell generator of FIG. 1 includes integral bottom and side walls 40, 42. The walls forming the outer nozzle 16 are integral with the bottom wall 40. By integral, it is meant that the walls of the nozzle are formed from the same block of material as the bottom and side walls of the container, without any bonding agent between them (which could fail at elevated temperatures and without any press fit which would produce stresses). By making the outer nozzle walls completely integral with the container, applicant avoids distortions of the outer nozzle, that arise when it is heated from room temperature to above 1000° F. Similarly, the walls of the inner nozzle 20 as well as the gas conduit 18 which passes through the molten material 14, are integral, to avoid twisting or other distortion caused during heating.

Applicant forms shells by removing a cover 44 on the container and placing one or more solid pieces of a high melting temperature material in the container 12. Applicant then later purges the atmosphere in the top of the container by passing helium gas into an intake 46 and out through a vent 48. The material is heated to a temperature above 1000° F. at which it is molten. It would be a simple matter to heat the container and its contents by resistance heating. However, because of the high temperatures involved, it requires considerable time for resistance heating. For very high melting temperatures of over 1500° C., it requires several hours to resistance heat a material from ambient temperature to perhaps 1500° C. If material is slowly heated past its melting temperature, recrystallization occurs. Recrystallization can result in the release and merging of gas, and the consequent formation of many tiny bubbles of various gases, the merged bubbles being of sufficient size to form substantial defects in the formed shells. Applicant minimizes the creation of such impurities of particles, by heating the very high temperature melting material rapidly. This is accomplished by induction heating, wherein large rapaidly varying currents are passed through a coil 50, to induce currents in a metallic material therewithin, which may be the shell material being heated, the container 12 or both. Since recrystallization occurs when heating of a material from ambient temperature lasts for about 30 minutes, applicant heats the material from about ambient temperature to its molten temperature of at least about 1500° C. in a few minutes, and in any case during a period of less than 15 minutes.

The molten shell material 14 is pressurized by pressured gas applied at the inlet 46, to push the molten material eventually through the outer nozzles 16. Applicant uses a filter 52 formed of multiple ceramic granuals or monolithic porous structures of other suitable materials, to filter out any undesireable particles and impurities. The pressured molten shell material 14 flows through flow channels 54 of a spacer 56 and into the outer nozzle.

The tip 20T of the inner nozzle is spaced behind the tip of the outer nozzle 16 by more than twice the diameter of the outer nozzle. This avoids the need to construct a very thin tip at the inner nozzle and to place it accurately concentric with the outer nozzle. Instead, Bernoulli forces cause small diameter streams of fluid such as gases to self center themselves within a flowing stream of forming material within the outer nozzle.

Applicant has formed microshells of a variety of materials and sizes using apparatus of the type shown in the figures. In one example, chunks of lead borate glass were placed in the container 12 and the container was heated to a temperature of 1650° F. (900° C.) to melt the glass. Gas under a pressure of about 30 psi was applied to the intake 46 while the vent 48 was blocked, to press the molten glass through the filter and through the outer nozzle 16. Spring loaded holdowns 64 press the cover of the container firmly in place against the pressure of the gas. Nitrogen or helium gas from a source 66 flowed out of the inner nozzle. The nozzles were of a size to form microshells having an outer diameter of about 0.5 milimeter. In the drop tower (FIG. 3) the upper five feet were heated to a temperature of about 930° F. (500° C.). Thermocouples labelled "TC" monitor the temperature in the drop tower.

Thus, the invention provides a method and apparatus for generating microshells having accurately spherical outer surfaces and having inner gas or other liquid bubbles precisely centered with respect to the outer surface of the shell. The upper surface of the drop tower into which the molten shells drop, is heated to at least 400° C. above ambient temperature along a length on the order of five feet, to cool the molten shell slowly enough to enable dissipation of surface waves. Immediately after the surface ripples die down, the shell is rapidly solidified to prevent decentering of the gas bubble as the shell falls along a drop tower filled with gas. The apparatus for generating shells can include a hole forming the outer nozzle, with the walls of the outer nozzle integral with the entire bottom wall of the container, to prevent distortion during heating from ambient temperature to a high temperature at which the shell material is molten. Such heating preferably occurs rapidly, within less than 15 minutes, to avoid recrystallization and the generation of undesirable small bubbles.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. Apparatus for forming accurately spherical and centered fluid-filled shells comprising:
    means for generating molten fluid-filled shells of a diameter no more than about one centimeter, of a material having a melting temperature of at least 1000° F.;
    a drop tower located below said shell generating means to receive molten shells, said tower having upper and lower portions;
    said shell generating means including inner and outer nozzles, and also includes means for pressuring a molten shell material and an inner fluid to flow respectively through said inner and outer nozzles to form a molten fluid-filled extrusion that breaks up into molten fluid-filled shells which initially have surface waves; and
    means for heating an upper portion of said tower which contains molten shells that have been formed by the broken up extrusion, along a length of at least one foot to a temperature that is more than 400° C. above ambient temperature, to allow relatively slow initial shell cooling to allow dissipation of surface waves while the shell is in substantially free fall, said upper portion of said tower being substantially devoid of sonic waves, the lower portion of said tower being at no more than about ambient temperature to enable cooling of the shell before the bubble therein can become uncentered.

2. The apparatus described in claim 1 wherein:
    said inner fluid which forms a bubble within the shell, is gaseous, so it tends to rise in a molten shell which is not in free fall; and including
    means for cooling the lower portion of said tower to a temperature at least 20° C. below ambient, beginning at a location below the heated portion, whereby to cool the shell so the bubble cannot float upwards as wind resistance increases.

3. The apparatus described in claim 1 wherein:
    said shell generating means includes a container for holding said shell material, said container including a bottom wall, said bottom wall having a tapered through hole which forms said outer nozzle, so that said bottom wall and nozzle are formed of the same piece of material without any bonding or pressure fitting between them.

4. Apparatus for generating fluid-filled shells of high melting temperature material comprising:
    a container for receiving high melting temperature nonelemental material, which melts at a temperature of at least 1500° C., said container having a lower end portion;
    an outer nozzle at the lower end portion of the container;
    an inner nozzle lying within the outer nozzle, and a source of pressured gas coupled to the inner nozzle to flow therethrough;
    an induction furnace which includes a coil surrounding said container and means for applying alternating current to said coil to heat a mass of material filling said container to at least 1500° C. in less than 15 minutes, to thereby minimize the formation of small gas bubbles; and
    a filter lying in the lower end portion of the container and positioned so that substantially all molten material must pass throught the filter before reaching the outer nozzle, whereby to filter out solid impurities that are present immediately prior to material flowing to the nozzle.

5. The apparatus described in claim 4 wherein:
    said container includes a bottom wall and integral side walls, said bottom wall having a tapered hole that forms said outer nozzle, the walls of said tapered hole being integral with said bottom and side walls without a bonding agent or press fitting between them.

6. A method for forming fluid-filled shells comprising:
    forming a gas-filled extrusion of a molten material having a temperature of at least 1000° F., flowing the extrusion into the top of a drop tower, and allowing the extrusion to break up into individual molten shells to fall along the tower;
    heating an upper portion of the tower along a length of over one foot below the location where individual shells are formed, to a temperature which is over 400° C. above room temperature and slowly cooling each molten shell during its substantially free fall along said upper tower portion to dampen surface waves while the shell remains still deformable, said upper portion of said tower being maintained substantially free of sonic waves; and
    maintaining at least the lower half of the tower at a temperature substantially no higher than room temperature, to cool the shell to a state where it is not deformed when in contact with other shells.
    said step of heating includes heating the upper portion of the tower to more than one-half the difference between the temperature of said molten shells at the instant they are formed, and room temperature.

7. A method for forming fluid-filled shells comprising:
    opening a container, placing solid shell-forming material therein, and closing the container, where the container and shell-forming material combined include electrically conductive material;

applying a varying electric field to said container and its contents to heat them to a temperature at which said shell-forming material is molten, and which is at least 1500° C., in a period of less than 15 minutes, to thereby avoid recrystallization and the possible formation of small gas bubbles in the shell-forming material; and forcing said molten material through an outer nozzle, while forcing a gas through an inner nozzle, to flow both through said ouer nozzle and form gas-filled shells.

8. The method described in claim 7 including: forcing said molten shell-forming material through a filter prior to forcing the material through said outer nozzle.

9. An apparatus for forming a sphere with a surface substantially free of surface waves, out of a material having a high temperature melting point above 1000 degrees F., comprising:

a container for said high temperature melting point material;

means for heating said high temperature melting point material in said container to its molten temperature;

means for forming a molten extrusion of said material, so the extrusion breaks up into spheres;

drop tower means lying in a region around said extrusion and under said region, for permitting the dropping of said spheres;

means for maintaining the temperature of said spheres immediately below said extrusion, at a temperature slightly above the molten temperature of said material until surface waves formed in the surface of said sphere due to separation from said extrusion dissipate; and, means for then cooling said spheres to their hardened state.

* * * * *